E. R. GRIFFITH.
BEAN SAVER.
APPLICATION FILED OCT. 7, 1918.
1,294,898.
Patented Feb. 18, 1919.
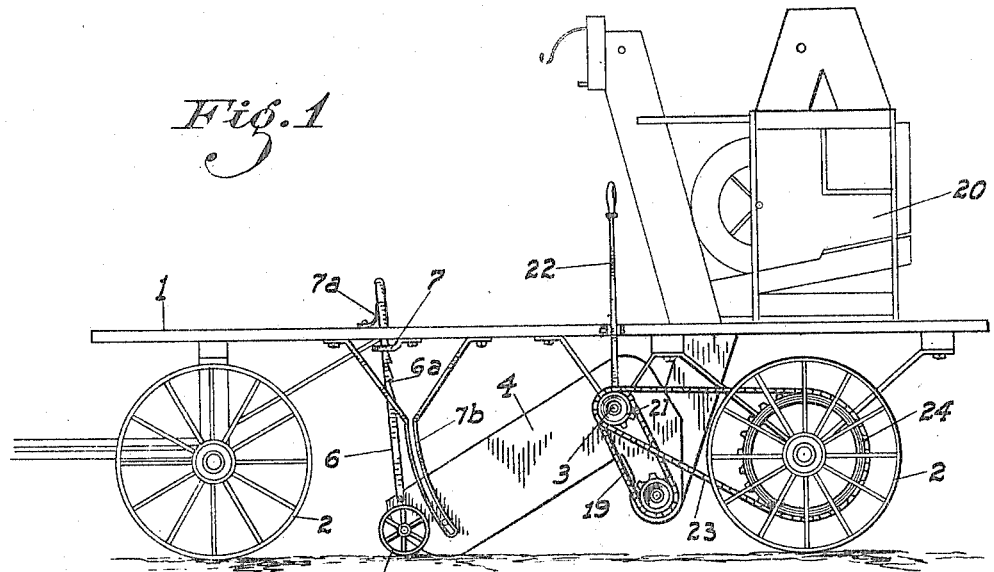
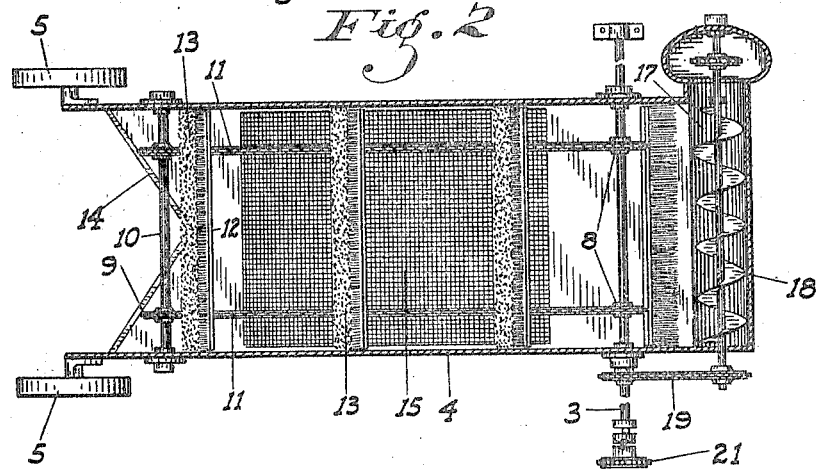
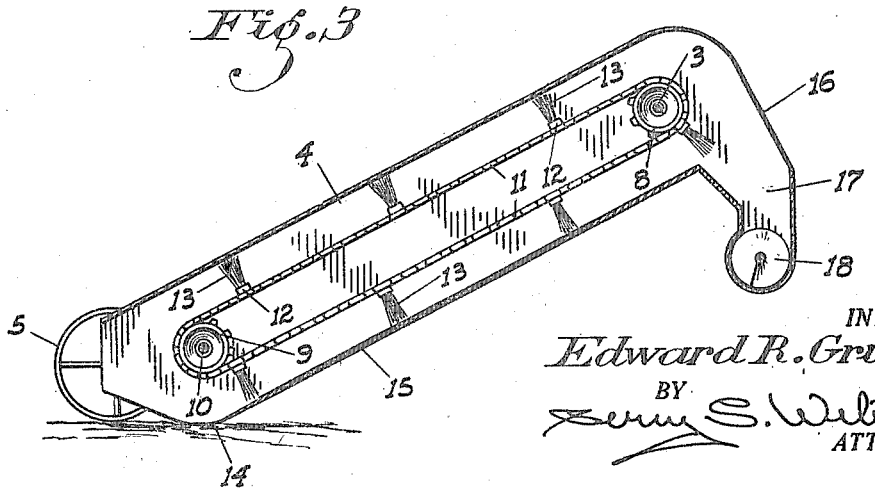
INVENTOR.
Edward R. Griffith
BY
ATTORNEY

UNITED STATES PATENT OFFICE.

EDWARD R. GRIFFITH, OF STOCKTON, CALIFORNIA.

BEAN-SAVER.

1,294,898.   Specification of Letters Patent.   Patented Feb. 18, 1919.

Application filed October 7, 1918. Serial No. 257,106.

*To all whom it may concern:*

Be it known that I, EDWARD R. GRIFFITH, a citizen of the United States, residing at Stockton, in the county of San Joaquin, State of California, have invented certain new and useful Improvements in Bean-Savers; and I do declare the following to be a full, clear, and exact description of the same, reference being had to the accompanying drawings, and to the characters of reference marked thereon, which form a part of this application.

This invention relates to an improvement in bean savers, the principal object of the invention being to provide a device, either horse or power driven, which goes along the bean rows after the bean cutting and harvesting machines have done their work, and salvages the bean pods and loose beans which have dropped or been broken off the vines and more or less mixed up with the soil during such harvesting, and of which there is usually a considerable quantity well worth saving.

A further object of the invention has been to produce such a machine as will gather up the stray bean pods and will separate the dirt therefrom before delivering them to the cleaner, which may be built on the machine as a part thereof but which forms no part of my invention.

As a third object, I have provided a simple and inexpensive device and yet one which will be exceedingly effective for the purpose for which it is designed.

These objects I accomplish by means of such structure and relative arrangement of parts as will fully appear by a perusal of the following specification and claims.

On the drawings similar characters of reference indicate corresponding parts in the several views.

Figure 1 is a side elevation of the complete machine.

Fig. 2 is a top plan view of the bean saving and dirt removing mechanism showing the same removed from the chassis or frame of the carrying vehicle.

Fig. 3 is a longitudinal section through the mechanism showing Fig. 2.

Referring now more particularly to the characters of reference on the drawings, the numeral 1 represents the main frame of the machine which is mounted on wheels 2, and may be drawn by horses or propelled by a gasolene engine mounted thereon as is desired.

At a suitable point on the frame a shaft 3 is turnably mounted on which is pivoted one end of a long box like conveyer frame 4. This member slants downward toward its forward end, at which point it is supported by small wheels 5 on either side thereof. A bar 6 having notches $6^a$ suitably spaced is pivoted at its lower end to the frame 4, and projects above the frame 1, one of the notches at a time being adapted to engage a lug member 7 secured to the frame 1. A spring $7^a$ is secured to the frame 1 and bears against the bar 6, so that the bar may have a certain amount of upward play and still have the notch being used remain in contact with the lug 7 when the bar descends. The purpose of this is to enable the wheels 5 on the front end of the frame 4 to follow the inequalities of the ground, so that the cutting edge thereon hereinafter described, will not dig too deeply into the dirt. The notches also enable me to raise such end completely from the ground in order to transport the machine when not working or to position the frame according to varying conditions of the fields in which the machine may operate. A guide member $7^b$ is mounted to the frame at either side of the frame 4 in order to hold the same against lateral strain. Mounted on the shaft 3 inside the frame 4 are chain sprockets 8, and similar sprockets 9 are mounted on a shaft 10 at the opposite or forward end of the member 4.

Endless chains 11 pass over these sprockets and have cross slats 12 at intervals thereon which slats are provided with stiff bristles 13 over their entire width. The forward and lower end of the frame 4 which is open to the ground is fitted with a transverse knife edge 14, substantially of a wide V shape, and whose edge is slightly below that of the wheels 5, to the rear of which is a screen 15 which forms the bottom of said member 4 for a considerable portion of its length. On the rear end of the structure 4 is a similar screen 16, such rear end terminating in a downwardly extending chute 17 which empties into a screw conveyer 18 situated transversely of the machine and operated by a chain gear 19 from the shaft 3 and adapted to feed to a cleaning device 20 carried by the frame 1.

Motion is given to the shaft 3 by means of a clutch mounted sprocket wheel 21 thereon, the clutch being thrown in or out by means of a lever 22 pivoted to the frame 1. A chain 23 passes over the sprocket 21 and over a large sprocket wheel 24 secured to one of the wheels 2, in order that during a forward motion of the machine, the salvage mechanism thereon will always be operating unless the aforementioned clutch connection is disconnected.

In the operation of the device, the knife edge 14, being on a slightly lower plane than the wheels 5, scrapes up all the beans lying on the surface of the ground, and also a certain percentage of dirt. The bristles 13, constantly revolving, carry the dirt and beans upward and along toward the chute 17. Most of the dirt, however, is forced by the grinding action of the bristles through the screen 15, and what remains is thrown by the bristles against the rear screen 16 when the bristles start to turn around the sprocket wheel 8 at that point. As the chains 11 are revolving at considerable speed, this action will cause the remaining dirt to be broken up against the screen and pass therethrough, the beans, owing to their greater size, dropping into the conveyer 18.

From the foregoing description it will be readily seen that I have produced such a device as substantially fulfils the object of the invention as set forth herein.

While this specification sets forth in detail the present and preferred construction of the device, still in practice such deviations from such details may be resorted to as do not form a departure from the spirit of the invention, as defined by the appended claims.

Having thus described my invention, what I claim as new and useful and desire to secure by Letters Patent is:

1. The combination with a wheel mounted frame of an inclined conveyer frame pivoted at its rear end to the frame of the machine and having its forward end adjacent the ground, wheels supporting said forward end, a transverse knife edge on the forward and lower edge of the conveyer frame, and means in said frame whereby the dirt and beans scraped up by the knife edge will be separated from each other and the beans collected and saved.

2. A bean saver comprising an inclined conveyer frame pivotally mounted at its rear end to a wheel mounted frame, a knife edge positioned across said conveyer frame at its forward and lower end adjacent the ground, wheels on said frame ahead of said knife edge, the outer and lower peripheries of which are slightly higher than said knife edge, and means whereby the position of the forward end of the conveyer frame and knife edge thereon may be changed relative to the ground.

3. A bean saver comprising an inclined conveyer frame pivotally mounted at its rear end to a wheel mounted frame, a knife edge positioned across the conveyer frame at the forward and lower end thereof normally adjacent the ground wheels on said frame forward of said knife edge to maintain the position of the knife edge relative to the ground, and means whereby said wheels are held against downward movement, but may have upward play to overcome inequalities in the ground.

4. A bean saver comprising an inclined conveyer frame pivotally mounted at its rear end to a wheel mounted frame, a knife edge positioned across the conveyer frame at the forward and lower end thereof normally adjacent the ground, whereby a mixture of dirt and beans will be scraped up thereby, a screen in the lower side of the conveyer frame to the rear of the knife edge, a chute at the rear of the said frame, a screw conveyer in the chute, and means operable with the forward motion of the wheel mounted frame whereby the beans will be carried from the knife edge to the screw conveyer, but the dirt therewith will be forced through the screen.

In testimony whereof I affix my signature in presence of two witnesses.

EDWARD R. GRIFFITH.

Witnesses:
BERNARD PRIVAT,
FRANK H. CARTER.